United States Patent
Shabtay et al.

(10) Patent No.: US 7,031,297 B1
(45) Date of Patent: Apr. 18, 2006

(54) POLICY ENFORCEMENT SWITCHING

(75) Inventors: Lior Shabtay, Ganei Tikva (IL); Yaron Nachman, Petach Tikva (IL); Ofir Friedman, Rishon Lezion (IL); Eyal Amitai, Ramat Gan (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 1052 days.

(21) Appl. No.: 09/596,003

(22) Filed: Jun. 15, 2000

(51) Int. Cl.
*H04L 12/66* (2006.01)

(52) U.S. Cl. .................. 370/352; 370/357; 370/389

(58) Field of Classification Search ............... 370/230, 370/235, 469, 395.4, 229, 231, 232, 233, 370/234, 236, 237, 238, 239, 240, 230.1, 370/357, 463, 335, 360, 419, 254–256, 390–397, 370/218, 401–408, 352, 250, 223–228, 249; 710/29; 711/145, 150, 151, 163; 709/223–228, 709/238, 236, 250, 230, 249, 240
See application file for complete search history.

(56) References Cited

U.S. PATENT DOCUMENTS

| | | | | |
|---|---|---|---|---|
| 5,634,072 A * | 5/1997 | Allen et al. | .................. | 718/104 |
| 5,859,835 A * | 1/1999 | Varma et al. | ................. | 370/229 |
| 6,101,189 A | 8/2000 | Tsuruoka | | |
| 6,118,760 A * | 9/2000 | Zaumen et al. | ............. | 370/229 |
| 6,134,217 A * | 10/2000 | Stiliadis et al. | ............. | 370/232 |
| 6,243,667 B1 * | 6/2001 | Kerr et al. | .................... | 703/27 |
| 6,377,998 B1 * | 4/2002 | Noll et al. | ................... | 709/236 |
| 6,401,117 B1 * | 6/2002 | Narad et al. | ................. | 709/223 |
| 6,421,730 B1 * | 7/2002 | Narad et al. | ................. | 709/236 |
| 6,466,984 B1 * | 10/2002 | Naveh et al. | ................. | 709/228 |
| 6,539,019 B1 * | 3/2003 | Noy et al. | ............. | 370/395.53 |
| 6,553,028 B1 * | 4/2003 | Tang et al. | .................. | 370/389 |
| 6,590,894 B1 * | 7/2003 | Kerr et al. | .................... | 370/392 |
| 6,597,700 B1 * | 7/2003 | Golikeri et al. | .............. | 370/401 |
| 6,625,689 B1 * | 9/2003 | Narad et al. | ................. | 711/110 |
| 6,647,419 B1 * | 11/2003 | Mogul | ........................ | 709/226 |
| 6,658,002 B1 * | 12/2003 | Ross et al. | .................. | 370/392 |
| 6,674,756 B1 * | 1/2004 | Rao et al. | ............. | 370/395.21 |
| 6,674,769 B1 * | 1/2004 | Viswanath | .................. | 370/469 |
| 6,680,943 B1 * | 1/2004 | Gibson et al. | .............. | 370/392 |
| 6,701,338 B1 * | 3/2004 | Narad et al. | ................. | 708/525 |
| 6,735,198 B1 * | 5/2004 | Edsall et al. | ................. | 370/389 |
| 6,789,118 B1 * | 9/2004 | Rao | ........................... | 709/225 |
| 6,798,788 B1 * | 9/2004 | Viswanath et al. | .......... | 370/469 |
| 6,810,431 B1 * | 10/2004 | Narisi et al. | ................. | 709/250 |
| 6,816,903 B1 * | 11/2004 | Rakoshitz et al. | .......... | 709/226 |
| 6,839,323 B1 * | 1/2005 | Foti | ........................... | 370/235 |

(Continued)

FOREIGN PATENT DOCUMENTS

| | | |
|---|---|---|
| JP | 10 154995 | 6/1998 |
| WO | WO 99/00949 | 1/1999 |
| WO | WO 99/01010 | 1/1999 |

OTHER PUBLICATIONS

Lucent Technologies; "Cajun P550 Routing Switch"; http://www.lucent.com/ins/products/p550/p550ir.html.

(Continued)

*Primary Examiner*—Wellington Chin
*Assistant Examiner*—Jamal A. Fox

(57) ABSTRACT

A method of performing policy enforcement by a switch, including receiving a plurality of frames, examining at least some of the received frames to determine whether they require non-default policy enforcement according to pre-programmed policy rules which pertain to at least one protocol, and forwarding, with default policy handling, at least some of the received frames which belong to the protocol to which the rules pertain, regardless of the policy enforcement they require.

57 Claims, 7 Drawing Sheets

U.S. PATENT DOCUMENTS

| | | | |
|---|---|---|---|
| 6,847,609 B1* | 1/2005 | Sarnikowski et al. | 370/229 |
| 6,859,841 B1* | 2/2005 | Narad et al. | 709/236 |
| 2002/0010793 A1* | 1/2002 | Noll et al. | 709/240 |
| 2003/0005103 A1* | 1/2003 | Narad et al. | 709/223 |
| 2003/0046423 A1* | 3/2003 | Narad et al. | 709/238 |
| 2003/0061332 A1* | 3/2003 | Narad et al. | 709/223 |
| 2003/0067926 A1* | 4/2003 | Golikeri et al. | 370/401 |
| 2004/0143655 A1* | 7/2004 | Narad et al. | 709/223 |
| 2004/0148382 A1* | 7/2004 | Narad et al. | 709/223 |

OTHER PUBLICATIONS

Lucent Technologies; "Cajun P550 Gigabit Switch and Routing Switch"; http://www.lucent.com/ins/library/pdf/brochures/p550.pdf; Oct. 1998.

Galileo; "Galileo Unveils GalNet-3 Architecture Family"; http://www.galileot.com/news/GalNet-3pr.htm; Nov. 29, 1999.

Lucent Technologies; "Cajun M770 M-MLS"; http://www.lucent.com/ins/products/m770/mmlsar.html.

Lucent Technologies, "Cajun M400 3LS"; http://www.lucent.com/ins/products/m400/3lsfb.html.

Yavatkar, R. et al.; "SBM (Subnet Bandwidth Manager): A Protocol for RSVP-based Admission Control over IEEE 802-style networks"; Internet Engineering Task Force; Internet-Draft; http://www.ietf.org/internet-drafts/draft-ietf-iss11-is802-sbm-10.txt; Jan. 2000.

Cisco System Inc.; "Configuring IOS Quality of Service on the Catalyst 6000 Family"; http://www.cisco.com/univercd/cc/td/doc/product/lan/cat6000/ios127xe/qos.htm; pps. 1-98.

* cited by examiner

| | 148 | 150 | 152 | 158 | 160 | 147 | 155 | 157 | 149 |
|---|---|---|---|---|---|---|---|---|---|
| | PROTOCOL | SOURCE ADDRESS | DESTINATION ADDRESS | SOURCE PORT | DESTINATION PORT | QOS | SNIFFING | STATS | SECURITY |
| 120A | TCP | | | | | | | | |
| 120A | TCP | | | | | | | | |
| 120A | TCP | | ... | ALL | | | | | |
| 120A | TCP | | | 1–1024 | | | | | |
| 120B | UDP | | | | | | | | |
| 120B | UDP | | | | | | | | ... |
| 120C | ICMP | | | | | | | | |

FIG. 4

POLICY ENFORCEMENT SWITCHING

FIELD OF THE INVENTION

The present invention relates to communication networks and to policy enforcement in communication networks.

BACKGROUND OF THE INVENTION

Data networks are widely used to allow fast communication between end-stations (e.g., computers), within organizations and between organizations. Data networks are generally packet based networks which, unlike switched networks, do not establish a unique physical link path between a source and destination. Rather, the messages passed between the end-stations are encapsulated in packets which carry destination addresses (e.g., IP addresses and MAC addresses). Switches and/or routers along the network direct the packets to their destinations based on the destination addresses.

In many cases, a message or a sequence of related messages (e.g., a data file or a video movie) transmitted between computers is encapsulated within a plurality of packets which carry the same addressing information. These packets are referred to as belonging to a single session. In many cases, while a message is being transmitted from a source computer to a destination, the destination transmits responses to the source computer. In the terminology of the present application, the transmissions from the source to the destination and from the destination to the source belong to two different sessions which together form a two-way session.

Within some local area networks (LANs), packets are forwarded by layer-2 switches based on their MAC addresses in what is referred to as layer-2 switching. In layer-2 switching, frames are passed between physical ports of the switches without changing the MAC addresses of the forwarded frames. When packets are passed between LANs (or VLANs), the packets are forwarded by routers in what is referred to as routing or layer-3 switching. The routing action generally includes changing the source and destination MAC addresses of the frame, usually based on the IP destination address of the frame, and reducing the value of a time-to-live (TTL) field of the frame by at least one. It is noted that in some cases routing is performed also within a LAN. Some switches, namely layer-3 switches, perform both layer-2 and layer-3 switching.

In the following description and in the claims, the term layer-2 switching refers to the complete forwarding of frames (bridging function) by a switch and does not include partial operations performed by switches during, and as part of, layer-3 switching (routing function).

Many routers and switches include fast paths, generally implemented in hardware, through which some packets, e.g., packets belonging to sessions from which other packets have recently been forwarded, are speedily forwarded.

FIG. 1 is a schematic illustration of frames 40 commonly used in packet based networks. As is known in the art, most frames 40 which pass through data networks comprise an IP packet 42 and a link layer header 44. IP packet 42 is formed of a layer-4 packet 45 and an IP header 46 which includes among other fields, a type of service (ToS) field 47 (a portion of which is referred to also as a different service code point (DSCP) field), a time to live (TTL) field 49, a protocol field 48, a source IP address field 50, and a destination IP address field 52. Layer-4 packet 45 usually includes a payload 54 and a protocol header, e.g., a TCP header 56. TCP protocol header 56 includes, among other fields, a source port field 58, a destination port field 60 and ACK, FIN and SYN bits 63, 64 and 62, respectively. Generally, TCP and UDP sessions are defined by the values of protocol field 48, source IP address field 50, destination IP address field 52, source port field 58, and destination port field 60.

Network connections between computers, although very important, carry with them the danger of unauthorized entrance through the network to computers which hold sensitive information. Many IP routers and layer-3 switches, check packets on which they perform layer-3 switching for adherence to security rules. Generally, the security rules are preprogrammed by a network manager of the network including the router or switch. Packets which do not adhere to pre-programmed security rules are logged and/or discarded in order to prevent, for example, illegal intrusion to computers or other end-stations of a LAN from computers external to the LAN. This behavior is referred to as access control.

In many cases, small and medium size organizations connect their computers such that some of the frames passing between computers of the organization do not pass layer-3 switching. In some organizations, when access control is required within the organization, for example to prevent a worker from a first department to access classified information from other departments, separate local area networks (LANs) connect the end-stations of the different departments. The LANs of the different departments may be connected through a router or layer-3 switch which performs access control. This method, however, requires additional wiring and switches. Alternatively, different virtual LANs (VLANs) are defined for the different departments. Alternatively or additionally, the computers of different departments are defined as belonging to different IP sub-nets, thus forcing the packets passing between sub-nets to pass through a router. In some cases, the passage of the frames through a router or layer-3 switch slows down the communication between computers not included in the same LAN or VLAN. Also, the wiring and/or VLAN setting requires much work from a network administrator.

Many organizations use, in addition to the access control performed by their routers and/or layer-3 switches, a firewall which is usually a software program which checks packets for adherence to more stringent security rules than those implemented by routers and switches. The firewall usually runs on an edge-router at the entrance to an organization or on a dedicated processor sometimes referred to in itself as a firewall.

Layer-3 switches also perform tasks other than access control which go beyond the routing of packets. These tasks, referred to as policy enforcement, generally differentiate between frames based on arguments different than used for forwarding. The policy enforcement tasks include, but are not limited to, access control, determining a quality of service (QoS) of packets and handling different packets according to their tagged or determined QoS, counting packets belonging to certain sessions (and/or having certain additional characteristics), and passing specific frames to a sniffing station in addition to their forwarding to their destination.

In some cases, the policy enforcement refers to information in IP header 46 and/or the UDP/TCP header 56 of the packets, for example the source and destination IP addresses and ports and the protocol field 48 of the packet. Alternatively or additionally, the policy enforcement refers to the VLAN to which the frame belongs and/or the physical port through which the frame was received.

Some layer-3 switches, such as the Cajun P550 switch available from Lucent Inc., and the GaINet-3 architecture family, available from Galileo, implement policy enforcement in their fast path. One type of these routers includes a large control table in which each transmission session has a respective entry, which lists the policy rules of the session. Frames which do not have an entry in the control table are passed to the processor which determines their policy based on preprogrammed rules and prepares an entry in the control table accordingly. This type of switches usually requires a control table with thousands (even tens of thousands) of entries which makes the routers more expensive than other routers. Also, the speed of operation of the fast-path of the router may be affected by the size of the table.

Other switches, such as the Cajun M770 M-MLS and the Cajun M400 3LS which are available from Lucent Inc., maintain sophisticated hardware data structures which perform access control frame filtering. The sophisticated hardware data structures implement the access control rules as programmed by the network manager of the switch.

Some layer-2 switches perform simple security checks at the level of layer-2, for example, they check whether the frames they receive are from end-stations or other network elements to which they are allowed to be connected.

In addition, some layer-2 switches, such as the Catalyst 3524XL and the Catalyst 6500 described in /www.cisco-.com/univercd/cc/td/doc/product/lan/cat6000/ios 127xe/ qos.htm, the disclosure of which is incorporated herein by reference, which are available from Cisco, perform QoS tasks which are based on general rules. These general rules allow a network manager to assign different QoS to packets of different protocols, e.g., FTP, MAIL and HTTP. In addition, these rules allow assigning different QoS to frames received through different physical ports. Furthermore, these rules allow trusting the tagged QoS in frames which carry specific IP source addresses. Also these switches allow use of the value of the ToS field 47 of the IP header of the packet in determining the QoS they use.

In an attempt to provide QoS per session within LANs, it has been suggested by the Internet Engineering Task Force (IETF) in "SBM (Subnet Bandwidth Manager), A Protocol for RSVP-based Admission Control over IEEE 802-style networks", draft-ietf-issll-is 802-sbm-10.txt, the disclosure of which is incorporated herein by reference, that when an end-station desires to form a connection with a high QoS, the end-station sends a special request message to the destination. All the switches along the path to the destination determine whether they agree to the high QoS to the connection. If all the switches agree to the special QoS, the switches program their hardware to handle with high QoS all frames belonging to the connection defined by the special request message.

SUMMARY OF THE INVENTION

One aspect of some embodiments of the present invention relates to a method of enforcing access control on packets belonging to a connection-based protocol, such as TCP. The first packet (or first few leading packets) of a connection-based session received by a switch (layer-2 and/or layer-3) or router is passed to a processor of the switch, or of a neighboring switch, to determine whether the packet is to be forwarded according to the access control policy. Further connection-based packets of a session are forwarded automatically, as they would not be sent unless the first packet was allowed to pass and was received by its destination end-station. In some embodiments, the first packet or the first two packets of a TCP session are identified based on the SYN bit and/or the ACK bit of the TCP header.

In some embodiments of the invention, the above method is performed by a hardware unit of a switch. The hardware unit may comprise a control table which has entries only for packets of connectionless protocols, such as UDP.

In some embodiments of the invention, the processor applies policy rules (other than access control) to some of the packets it receives, i.e., packets belonging to specific sessions. If the policy to be applied to the session of a packet is different (or substantially different) from a default policy, a respective entry for the session is opened in the control table. When a packet of a connection-based protocol which is not a leading packet of a session is received, the hardware unit checks if a respective entry is included in the control table. If an entry exists, the packet is handled according to the listed policy. Otherwise, the packet is forwarded with default policy handling. The policy rules may include, for example, access control, QoS, sniffing and/or frame counting.

By using the above embodiments, the number of sessions for which entries are created in the table is normally only a small fraction, e.g., less than 10%, of the sessions passing through the switch. In an embodiment of the invention, the table has 512, 256 or even only 128 entries which are used for policy enforcement.

An aspect of some embodiments of the present invention relates to Layer-2 or Layer-3 switches which perform policy enforcement of frames which they switch in layer-2. In an embodiment of the invention, the policy enforcement includes access control, QoS determination, sniffing and/or frame counting. In some embodiments of the invention, the policy enforcement is performed from the first packet of a session without requiring a preliminary frame requesting non-default policy handling of the frames of a session.

An aspect of some embodiments of the present invention relates to a layer-2 network in which substantially all the switches implement policy enforcement. By implementing policy enforcement in each of the switches, the policy enforcement load on each of the switches is reduced, simplifying the switches, e.g., reducing the size of the hardware table they require. Furthermore, implementing access control in all the layer-2 switches of a network minimizes the damage which can be caused by unauthorized packets to the switches themselves (e.g., changing their routing tables) and/or to the network, e.g., due to a flooding of the network.

In some embodiments of the invention, frames which pass policy enforcement in one of the switches of the network do not undergo policy enforcement in other switches of the network, but rather are forwarded immediately. In an embodiment of the invention, frames received from a port connected to a switch known to perform policy enforcement do not undergo policy enforcement. Alternatively or additionally, frames which passed policy enforcement are marked with a symbol which notifies other switches that the frame passed policy enforcement.

In an embodiment of the invention, each switch of the network performs policy enforcement on some of the traffic passing through the network, such that substantially each frame passing through the network, which should undergo policy enforcement, passes policy enforcement in at least one of the switches. Alternatively or additionally, each switch of the network performs one or more of the policy enforcement tasks offered by the network, such that together the switches of the network perform all the policy enforcement tasks offered by the network on substantially all the frames passing through the network.

There is therefore provided in accordance with an embodiment of the invention, a method of performing policy enforcement by a switch, including receiving a plurality of frames, examining at least some of the received frames to determine whether they require non-default policy enforcement according to pre-programmed policy rules which pertain to at least one protocol, and forwarding, with default policy handling, at least some of the received frames which belong to the protocol to which the rules pertain, regardless of the policy enforcement they require. In some embodiments the method includes, applying non-default policy enforcement to the examined frames which so require.

Optionally, examining at least some of the received frames to determine whether they require non-default policy enforcement includes determining whether the at least some of the received frames adhere to user pre-programmed security rules. In some embodiments the method includes, discarding examined frames which do not adhere to the security rules. Optionally, examining at least some of the received frames to determine whether they require non-default policy enforcement includes determining the required quality of service of the frames and/or determining whether the at least some of the received frames require sniffing or counting. Optionally, examining the at least some of the received frames includes comparing values of one or more of the fields of the frames to respective fields in a list of policies of groups of frames. Optionally, forwarding at least some of the frames regardless of the policy enforcement they require includes forwarding, with default policy handling, non-leading frames of sessions of a connection-based protocol for which no match was found in the comparing to the list. Optionally, examining at least some of the received frames includes checking frames for which no match was found in the comparison to the list against the pre-programmed rules.

Optionally, forwarding at least some of the frames regardless of the policy enforcement they require includes forwarding, with default policy handling, substantially all non-leading frames of sessions of a connection-based protocol.

Optionally, forwarding, with default policy handling, substantially all non-leading frames of sessions of a connection-based protocol includes forwarding, with default policy handling, substantially all frames starting with the third frame of two-way sessions of a connection-based protocol. Optionally, forwarding all non-leading frames of sessions of a connection-based protocol includes forwarding, with default policy handling, substantially all frames starting with the second frame of two-way sessions of a connection-based protocol.

Optionally, the connection-based protocol includes the TCP protocol. Optionally, examining at least some of the received frames includes examining leading frames of sessions of connection based protocols. Optionally, examining at least some of the received frames includes examining frames of connectionless protocols. Optionally, forwarding, with default policy handling, at least some of the frames includes forwarding, with default policy handling, frames which include IP packets. Optionally, forwarding, with default policy handling, at least some of the received frames regardless of the policy enforcement they require includes forwarding, with default policy handling, substantially all the frames received from one or more specific physical ports of the switch. Optionally, the one or more specific physical ports are connected to switches which perform policy enforcement. Alternatively or additionally, the one or more specific physical ports are not connected directly to end-stations.

Optionally, forwarding, with default policy handling, at least some of the received frames regardless of the policy enforcement they require includes forwarding, with default policy handling, frames received with indications that the frames underwent policy enforcement.

Alternatively or additionally, forwarding, with default policy handling, at least some of the received frames regardless of the policy enforcement they require includes forwarding the at least some of the received frames without determining the policy they require.

Further alternatively or additionally, forwarding, with default policy handling, at least some of the received frames regardless of the policy enforcement they require includes forwarding at least one frame with a policy different than required by the preprogrammed rules and/or forwarding, with default policy handling, frames which require policy handling which differs from the default only in the required quality of service.

There is further provided in accordance with some embodiments of the invention, a method of performing policy enforcement by a switch, including receiving a plurality of frames, comparing the values of one or more fields of at least some of the plurality of frames to entries of a list, determining whether to additionally analyze the frames for which no match was found in the comparison, additionally analyzing at least some of the frames for which no match was found in the comparison, and forwarding at least some of the frames for which no match was found in the comparison without performing additional analysis.

Optionally, the list identifies frames which may be forwarded without violating security rules. Optionally, additionally analyzing at least some of the frames for which no match was found in the comparison includes analyzing those frames belonging to connectionless protocols and/or analyzing leading frames of sessions of connection based protocols.

Optionally, the one or more fields include source and destination address fields. Optionally, at least some of the frames are not compared to the entries of the list. In some embodiments, leading frames of sessions of connection based protocols are not compared to the entries of the list. Optionally, forwarding without performing additional analysis includes forwarding those frames which are non-leading frames of connection based protocol sessions. Optionally, determining whether to additionally analyze includes determining based on at least one field not included in the comparison. Optionally, determining whether to additionally analyze includes determining the protocol to which the frame belongs. Optionally, the additional analysis is performed by a separate unit than performs the comparison. Optionally, the comparison is performed by a hardware unit of the switch and the additional analysis is performed by a processor of the switch. Optionally, the entries of the list are stored in a storage area of the hardware unit.

There is further provided in accordance with some embodiments of the invention, a method of performing policy enforcement by a switch, including receiving a plurality of frames, determining whether to compare the values of one or more fields of at least some of the plurality of frames to entries of a list of policies of groups of frames, comparing the values of one or more fields of the determined frames to respective fields of entries of the list, and forwarding, discarding or further analyzing frames determined not to be compared.

Optionally, determining whether to compare includes determining based on the physical port from which the frame was received and/or based on the protocol of the frame. Optionally, further analyzing includes transferring to a processor of the switch.

There is further provided in accordance with some embodiments of the invention, a switch for forwarding frames, including at least one port which receives frames, and a table which includes entries which list policies of groups of frames, and indicates for at least one of the entries different behavior for leading and non-leading frames of sessions matching the entry.

In some embodiments, the switch includes a hardware unit which forwards the non-leading frames of sessions matching the at least one of the entries which indicate different behavior for leading and non-leading frames, without further analysis. In some embodiments, the switch includes a processor which analyzes the leading frames of sessions matching the at least one of the entries which indicate different behavior for leading and non-leading frames. Optionally, each entry of the table matches frames of a plurality of sessions.

There is further provided in accordance with some embodiments of the invention, a switch for forwarding frames, including at least one port which receives frames, a table which includes entries which list policies of groups of frames and a hardware unit which compares the values of one or more fields of at least some of the received plurality of frames to entries of the table and forwards with a default policy at least some of the frames for which no match was found in the comparison. In some embodiments, the switch includes a processor which analyzes at least some of the frames for which no match was found in the comparison. Optionally, the policy table includes a plurality of groups of entries with different key fields. Alternatively or additionally, the policy table includes at least one field which receives wildcard values.

There is further provided in accordance with some embodiments of the invention, a method of performing policy enforcement by a switch, including receiving a plurality of frames, comparing at least some of the received frames to a list of groups of frames and respective policies, and creating entries in the list for less than all of the compared frames for which no match was found in the comparison to the list.

Optionally, creating entries in the list for less than all of the compared frames includes creating entries only for frames received through physical ports connected directly to end-stations. Alternatively or additionally, creating entries in the list for less than all of the compared frames includes creating entries only for frames belonging to connectionless protocols. Further alternatively or additionally, creating entries in the list for less than all of the compared frames includes not creating entries for at least some of the frames which require a policy which differs from a default policy only in quality of service. Optionally, creating entries in the list for less than all of the compared frames includes not creating entries for at least some of the frames which require a policy which differs from a default policy only in tasks other than quality of service. Optionally, the method includes determining, for the compared frames, a probability that additional frames of the same session will be received by the switch and creating entries only for frames with a probability higher than a predetermined level.

There is further provided in accordance with some embodiments of the invention, a method of forwarding a frame by a switch, including receiving a frame, checking one or more layer-3 or above fields of the frame for adherence to security rules, and performing layer-2 hardware switching of the frame, if the frame adheres to the security rules.

In some embodiments, performing layer-2 switching of the frame includes forwarding without changing a source and/or destination MAC address of the frame. Optionally, checking the frame for adherence to security rules includes checking by a hardware unit. Optionally, checking for adherence to security rules includes checking by a hardware unit.

There is further provided in accordance with some embodiments of the invention, a switch for forwarding frames, including at least one port which receives frames, a security unit which checks the received frames for adherence to security rules, and a forwarding unit which performs layer-2 switching of frames which adhere to the security rules.

Optionally, the security unit includes a policy table which has a plurality of entries to which the received frames are compared. Optionally, the switch has at least one group of eight ports and the policy table has room for up to 256 entries for each group of eight physical ports of the switch. Optionally, the switch cannot perform layer-3 routing. In some embodiments, the security unit includes a hardware unit.

There is further provided in accordance with some embodiments of the invention, a switch for forwarding frames, including at least one port which receives frames, a policy table which includes entries, addressed by at least two key fields, for sessions which should receive non-default policy behavior, a policy unit which checks whether at least some of the received frames which do not have respective entries in the policy table require non-default policy behavior, and a forwarding unit which performs layer-2 switching of the at least some of the received frames in accordance with the policy behavior determined by the policy unit. Optionally, the policy unit also checks whether received frames which have respective entries in the policy table require non-default policy behavior. Optionally, the policy unit includes a hardware unit which checks received frames which have respective entries and a processor which checks received frames which do not have respective entries in the table. Optionally, the entries of the table are addressed by at least the IP source and destination addresses of the received frames. Optionally, the entries of the table each define a single session.

There is further provided in accordance with some embodiments of the invention, a=method of updating a policy table of a switch, including receiving a frame which is not directed to the switch, creating an entry in the policy table of the switch, for the session to which the received frame belongs, and performing layer-2 switching of the received frame.

In some embodiments, the method includes determining whether the received frame requires non-default policy enforcement, and creating the entry is performed only if the received frame requires non-default policy enforcement. Optionally, the received frame belongs to a connection-based protocol. Optionally, determining whether the received frame requires non-default policy enforcement includes checking whether the frame requires sniffing and/or whether the frame belongs to a group which requires frame counting. Alternatively or additionally, determining whether the received frame requires non-default policy enforcement includes checking whether the frame violates security rules.

Optionally, determining whether the received frame requires non-default policy enforcement includes checking whether the frame requires a non-default QoS behavior. Optionally, receiving the frame includes receiving a frame which does not relate to the same session as addressed by any recently received control message.

There is further provided in accordance with some embodiments of the invention, a packet based network, including a plurality of at least three switches which perform layer-2 switching of frames, one or more links which connect the plurality of switches to each other, at least 50% of the switches including a policy unit which performs policy enforcement on at least some of the frames transmitted within the network. In some embodiments, substantially all the switches in the network include a policy unit which performs policy enforcement on at least some of the frames transmitted within the network. In some embodiments, at least some of the policy units of the switches perform different groups of policy enforcement tasks.

BRIEF DESCRIPTION OF FIGURES

Particular embodiments of the invention will be described with reference to the following description of embodiments in conjunction with the figures, wherein identical structures, elements or parts which appear in more than one figure are preferably labeled with a same or similar number in all the figures in which they appear, in which:

FIG. 4 is a schematic illustration of a policy enforcement table, in accordance with an embodiment of the present invention;

DETAILED DESCRIPTION OF EMBODIMENTS

Figure 2:
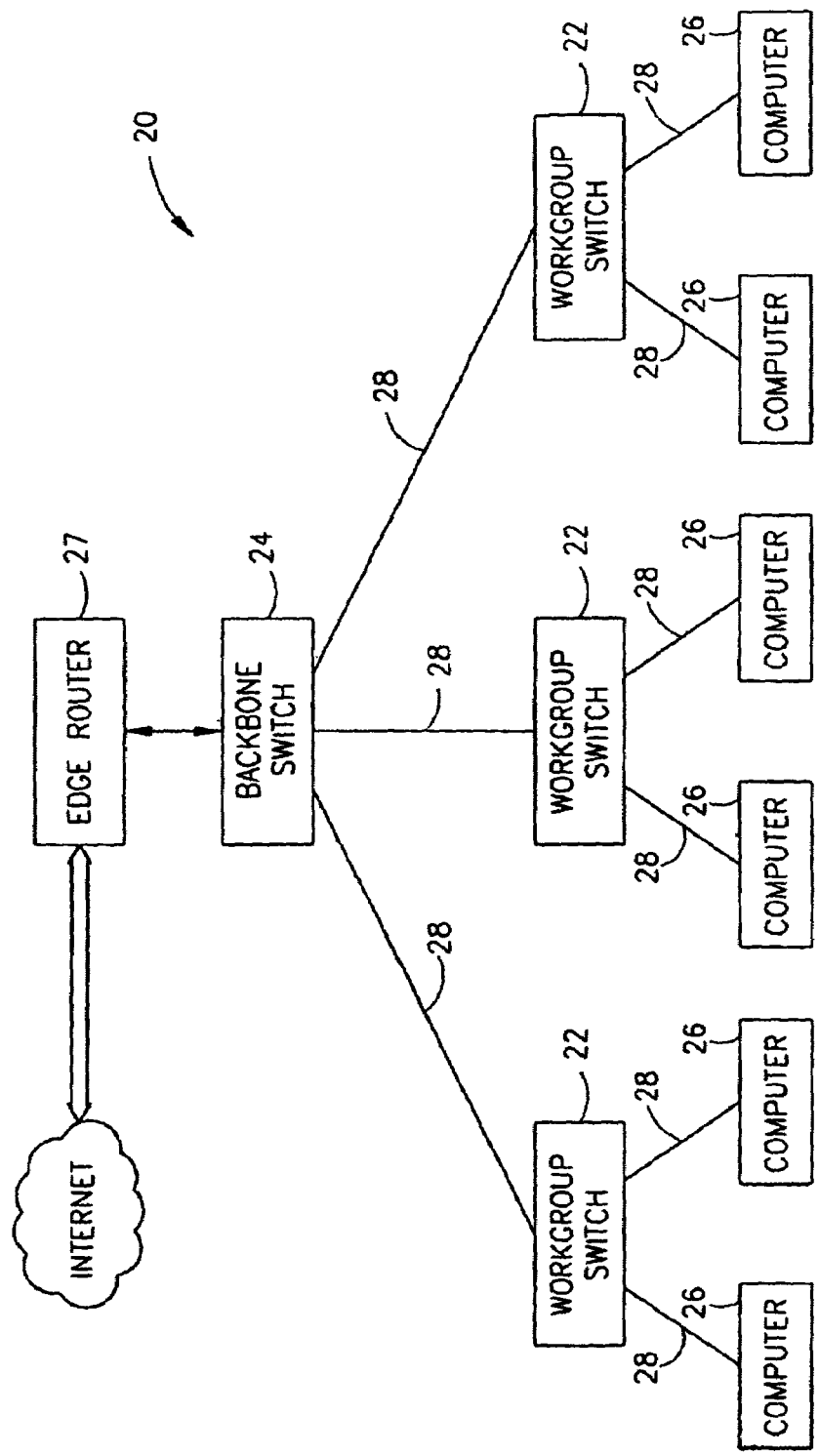
FIG. 2 is a schematic block diagram of a simple local area network, useful in explaining an embodiment of the present invention.

FIG. 2 is a schematic block diagram of a simple local area network 20, useful in explaining an embodiment of the present invention. Network 20 includes a plurality of computers 26 (or any other end-stations) which are connected, through links 28, to workgroup switches 22, which in turn connect to a backbone switch 24. In some embodiments of the invention, workgroup switches 22 and backbone switch 24 are layer-2 switches. Alternatively, some or all of workgroup switches 22 and backbone switch 24 are layer-3 switches. In an exemplary embodiment of the invention, workgroup switches 22 and/or backbone switch 24 comprise 802.1+802.3 Ethernet switches. Optionally, backbone switch 24 is connected to an edge-router 27 which connects network 20 to a wide area network such as the Internet. Edge-router 27 optionally carries a firewall and/or other protective hardware and/or software, which protects network 20 from external attempts to violate security regulations. Alternatively or additionally, other network elements, such as a stand alone firewall, are used to protect network 20 from external intruders. It is noted that network 20 is shown for illustrative purposes and that the present invention may be implemented in switches of substantially any network configuration.

Figure 3:
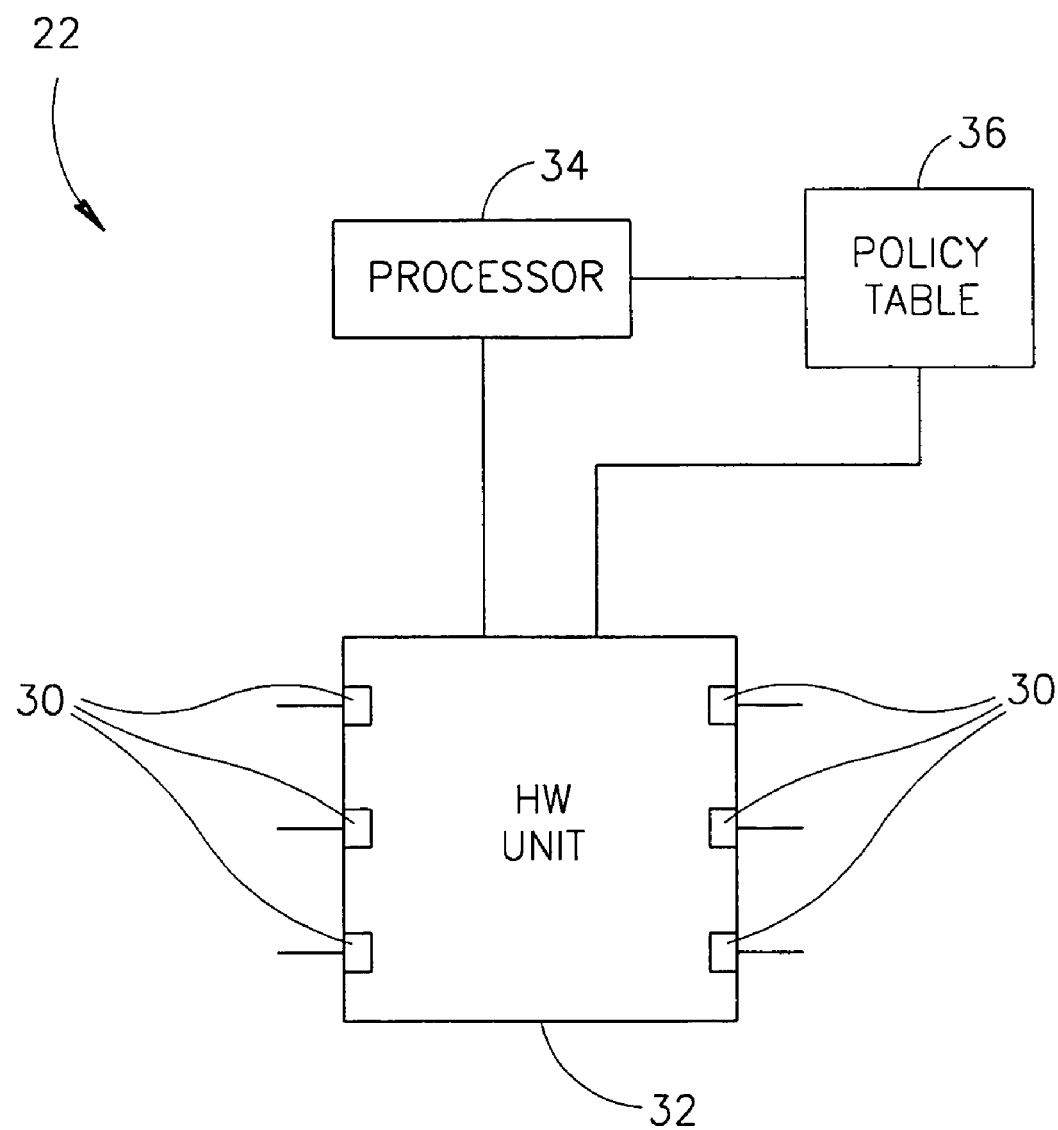
FIG. 3 is a block diagram of a workgroup switch, in accordance with an embodiment of the present invention.

FIG. 3 is a block diagram of a workgroup switch 22, in accordance with an embodiment of the present invention. Switch 22 comprises a plurality of ports 30 which lead to computers 26 or to other network elements (e.g., switches, routers, firewalls), via links 28 (FIG. 2). A hardware unit 32 forwards data frames between ports 30 as is known in the art. In accordance with some embodiments of the invention, hardware unit 32 performs policy enforcement on at least some of the frames on which it performs layer-2 switching.

In an embodiment of the invention, the policy enforcement performed by hardware unit 32 includes access control, determining the appropriate QoS of the frames it handles and/or applying monitoring options, such as sniffing and frame counting, on frames on which the network policy so requires. Alternatively or additionally, the policy enforcement includes other tasks which differentiate between frames based on arguments different than used for forwarding.

In some embodiments of the invention, switch 22 comprises a policy table 36 which is used by hardware unit 32 in performing policy enforcement. In some embodiments of the invention, frames for which hardware unit 32 cannot determine a deserved policy are passed to a processor 34 for policy enforcement. In some embodiments, the contents of policy table 36 are dynamically adjusted by processor 34 based on the frames passed to it by hardware unit 32 and based on predetermined policy rules which may be user configured.

In an embodiment of the invention, at least some of the frames for which a match does not exist in table 36 are forwarded without consulting processor 34. In some embodiments of the invention, processor 34 carries one or more security rules. Policy table 36 lists sessions or other frame categories which are known to adhere to the security rules carried by processor 34.

It is noted that in some embodiments of the invention, and unlike many layer-2 switches of the prior art, switch 22 examines fields within IP header 46, layer-4 protocol header 56 (FIG. 1) and/or higher layer parts of frame 40 such as the layer-7 payload 54.

FIG. 4 is a schematic illustration of table 36 of switch 22, in accordance with an embodiment of the present invention. Table 36 comprises a plurality of entries 120 (labeled 120A, 120B and 120C) which include key fields 122 which are compared with respective fields of received frames 40 to determine whether there is a match, and result fields 124 which include directions on handling the frames matching the entry.

In an exemplary embodiment of the present invention, key fields 122 include a protocol field 148, source and destination IP address fields 150 and 152, and source and destination port fields 158 and 160. In some embodiments of the invention, key fields 122 also include one or more fields which indicate a virtual local area network (VLAN) to/from which matching frames belong and/or one or more fields which list physical ports through which matching frames pass. The above fields are brought by way of example, and additional or alternative fields (e.g., a QoS field) may be included in key fields 122 in accordance with the present invention. Specifically, some entries which represent sessions of protocols for which one or more key fields 122 are inapplicable may be assigned arbitrary values, which match all frames, for these key fields.

In some embodiments of the invention, policy table 36 comprises a plurality of tables which have different key fields 122. In some embodiments of the invention, all the tables in policy table 36 have at least two key fields 122. The number of key fields 122 and/or the contents of key fields 122 are generally different for the different tables. Furthermore, in some embodiments, each table has room for a minimal number of different entries, e.g., at least eight entries.

Alternatively or additionally, one or more key fields 122 may receive wildcard values which match ranges of values and/or all possible values.

The result fields 124 include one or more policy behaviors enforced on frames matching key fields 122. In an exemplary embodiment of the invention, result fields 124 include a security field 149 which states whether the frame should be forwarded, discarded or discarded and logged and a QoS field 147 which contains indication of the QoS with which frames which match the key fields 122 of the entry should be handled. Alternatively or additionally, QoS field 147 states that a QoS field within frame 40, e.g., ToS field 47, and/or any other QoS field, should be used in determining the QoS of the frame. In an embodiment of the invention, QoS field 147 also states whether the listed QoS should be tagged to the frame or should be used only within the switch. Alternatively or additionally, result fields 124 include a sniffing field 155 which optionally states an additional port to which frames matching the entry should be forwarded. Further alternatively or additionally, result fields 124 include a statistics field 157 which keeps track of the number of frames matching the entry which passed through the switch and/or contains a pointer to an external counter.

In an exemplary embodiment of the present invention, as described hereinbelow in detail, for some of the received frames access control is performed entirely by hardware unit 32, for other received frames the access control is performed by hardware unit 32 in conjunction with policy table 36 and some frames are passed to a processor 34 for access control.

In an embodiment of the invention, switch 22 relates differently to frames which include packets of connection-based protocols, e.g., TCP, than to frames of connectionless protocols, e.g., UDP. Frames belonging to connection-based protocols generally identify within them the position of the current frame within a session, e.g., beginning, middle or end of session. The ports of connection-based protocols generally keep track of the state of the session and have different states for different stages of a session. A port of a connection-based protocol which receives, for example, a frame which belongs to the middle of a session while the port is in a state at the beginning of the session, will generally discard the frame.

In some embodiments of the invention, switch 22 checks only leading frames of sessions of connection-based protocols, for adherence to security rules. Discarding, by switch 22, of the leading frames of a two-way session which does not adhere to the security rules, prevents the source and destination computers from receiving from each other the leading frames of the two-way session, and hence from moving their ports of the two-way session to an established state. Any non-leading frames of the session received by the destination computer without having a port in the established state ready to receive the packet, will be discarded by the destination computer as a frame which belongs to a non-existing session.

In some embodiments of the invention, switches 22 track and discard error messages, e.g., ICMP messages, which are sent responsive to arrival of non-leading frames of connection-based sessions to a port of an end-station which is not in the established state. This prevents the transmission of ICMP messages which may give away information on the destination computer in response to packets sent in accordance to screening methods used by hackers.

Figure 5A:
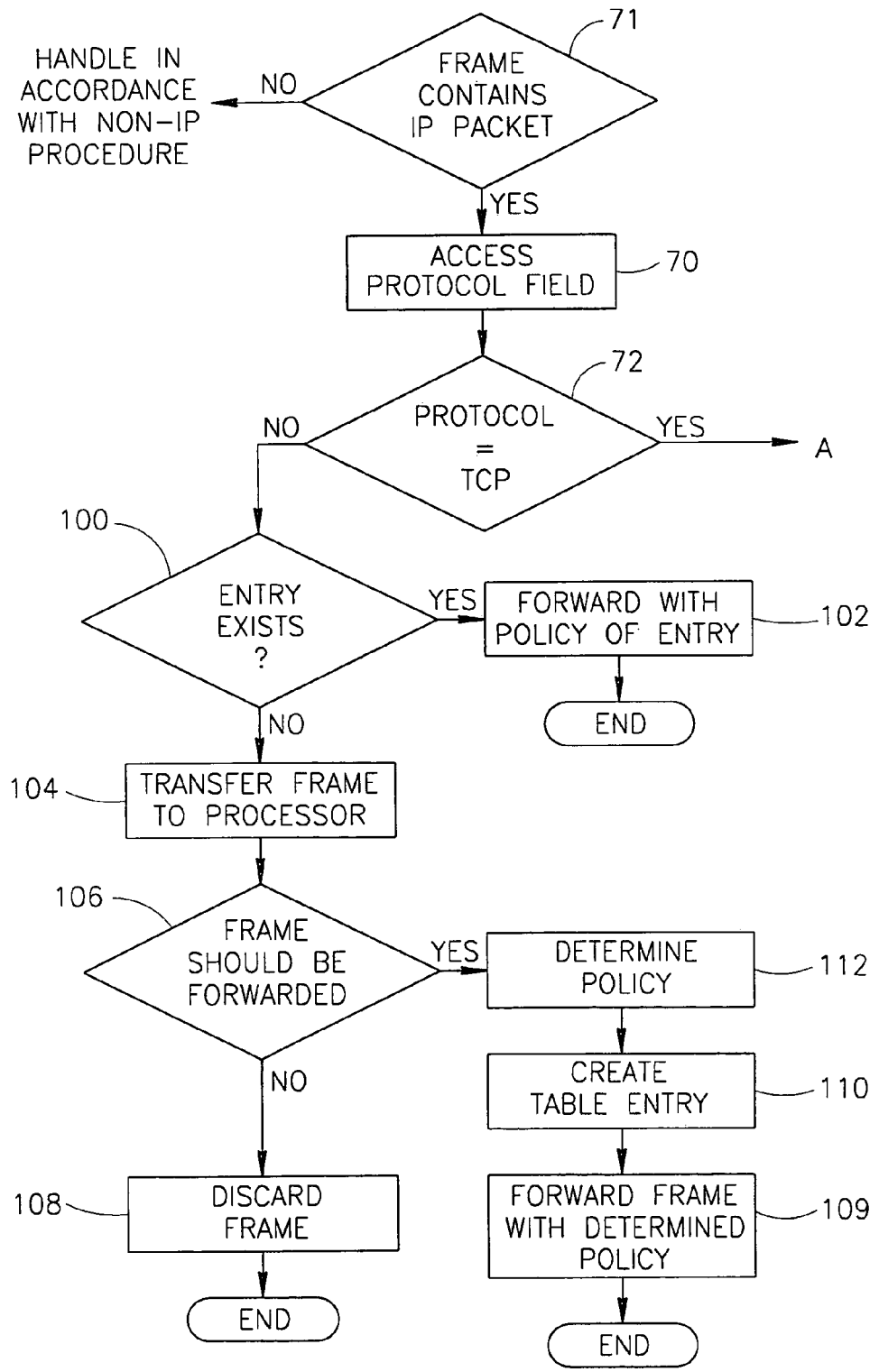
FIGS. 5A and 5B are a flowchart of a method of policy enforcement, in accordance with an embodiment of the present invention.
Figure 5B:
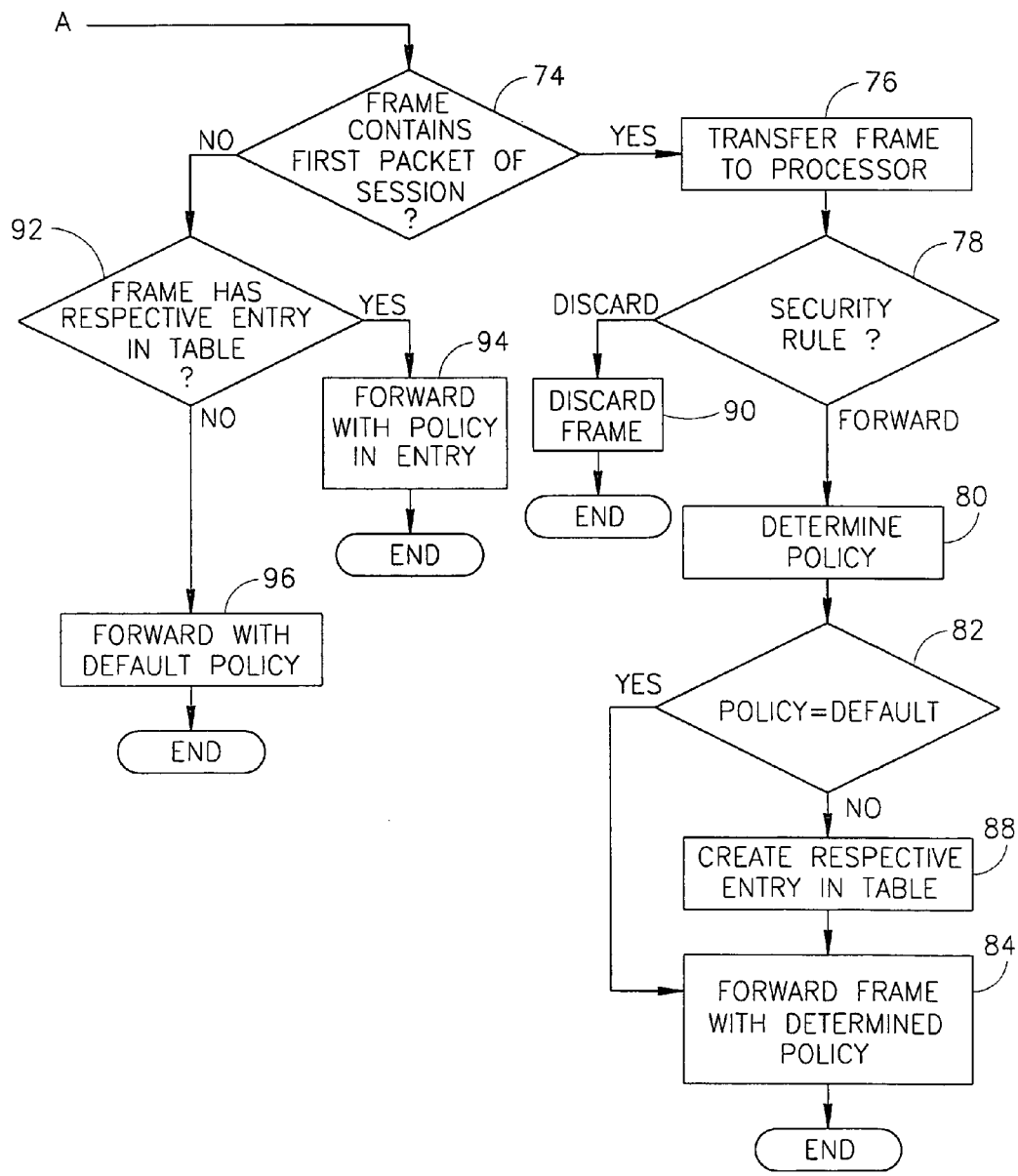

FIGS. 5A and 5B are a flowchart of the actions of switch 22 in applying policy enforcement to a received frame, in accordance with an embodiment of the present invention. For each frame 40 (FIG. 1) received, hardware unit 32 determines (71) whether the frame 40 contains an IP packet. In some embodiments of the invention, non-IP packets are handled in a manner similar to the following description for handling of IP packets. Naturally, adjustments are required due to the differences between IP packets and other protocol packets. Alternatively, non-IP packets are forwarded without policy enforcement or are all passed for policy enforcement to processor 34 as in many networks the amount of non-IP packets is very small and generally unimportant. For IP packets, hardware unit 32 accesses (70) the protocol field 48 in the IP header 46 of the frame 40. If (72) the protocol field indicates TCP, hardware unit 32 checks (74) whether the frame contains the first packet of a two-way TCP session, for example by checking that the ACK bit 63 in the TCP header 56 of frame 40 is not set. In an embodiment of the invention, hardware unit 32 also checks that the SYN bit is lit, in determining that a frame contains a first packet of a two-way TCP session. If frame 40 contains a first packet of a TCP two-way session, the frame is transferred (76) to processor 34 for further handling. Processor 34 determines (78) whether frame 40 adheres to predetermined security rules using any method known in the art.

If frame 40 is allowed to be forwarded according to the security rules, processor 34 optionally determines (80), based on predetermined rules, the policy with which the frame is to be forwarded, such as the quality of service (QoS) of the frame, and/or whether the frame should undergo sniffing and/or counting. If (82) the determined policy is default, e.g., the frame is forwarded with the QoS tagged to the frame and no sniffing and/or counting are required, the frame is forwarded (84) without further actions. Otherwise, a respective entry is created (88) in table 36 so that following frames of the same session will be forwarded by hardware unit 32 in accordance with the proper policy. By not creating entries for TCP sessions which have default QoS policy, the number of entries in table 36 is substantially reduced.

In an embodiment of the invention, when the only difference from the default policy handling is in the QoS and the frame was received from a port 30 not connected directly to a computer 26 (or any other end-station), no entry is created in table 36 for the session of frame 40. Frames received by workgroup switches 22 from ports not directly connected to computers 26 are generally tagged with a proper QoS policy such that the default behavior is normally the same behavior as would be listed in table 36. In addition, frames received by workgroup switches 22 from ports not directly connected to computers 26 are generally headed to a computer 26 directly connected to the switch and therefore these frames have only a single remaining hop. Determining the exact QoS at such a late stage is of little consequence, and therefore there is no need to create an entry for these sessions in table 36. By not preparing entries for sessions in the direction to computers 26 connected directly to switch 22, the number of entries in table 36 is substantially reduced.

If, however, the frame is determined (78) not to adhere to the security rules, the frame is discarded (90) and optionally logged if so required by the policy rules. As described above, discarding (90) these frames eliminates the need for applying the security rules on TCP frames which do not contain a first packet of a two-way session, as such security violating frames will usually not be sent and even if they are sent they will be discarded by the receiving computer.

If (74) the frame does not contain the first packet of a two-way session, hardware unit 32 determines (92) whether an entry of the session to which the frame belongs exists in table 36. If such an entry exists, the frame is forwarded (94) in accordance with the policy listed in the entry, e.g., with the QoS listed in the entry. Otherwise, the packet is forwarded (96) with a default policy behavior, e.g., a default QoS value or with the QoS value in the frame.

Alternatively, hardware unit 32 determines for all TCP packets, including leading packets of sessions, whether (92) a respective entry exists in table 36. If an entry exists, hardware unit 32 forwards (94) the frame with the policy listed in the entry. Only if an entry does not exist, hardware unit 32 determines (74) if the frame includes a leading packet and transfers leading packets to processor 34.

If (72) the protocol field 48 (FIG. 3) does not indicate TCP, hardware unit 32 determines (100) whether a respective entry exists for the frame in table 36. If such an entry exists the frame is forwarded (102) according to the policy listed in the entry. If a respective entry does not exist, the frame is transferred (104) to processor 34 which determines (106) whether the frame should be forwarded (109) or discarded (108). Optionally, processor 34 determines (112) the policy of some or all of the forwarded frames. In some embodiments, an entry in table 36 is created (110) for frames which are forwarded. In one embodiment, the determined (112) policy is stored in the created entry.

Optionally, before determining (100) whether an entry matching the frame exists, hardware unit 32 checks whether the packet was received from a port 30 connected directly to a computer 26. In an embodiment of the invention, if the packet was not received directly from a computer 26, the packet is forwarded without consulting table 36 using a default policy behavior, as the frame is very close to its destination and probably passed any required policy handling in other switches of network 20.

Alternatively, frames not received directly from a computer 26 are first compared to table 36, and if no match is found they are forwarded without additional analysis by processor 34. In some embodiments of the invention, when processor 34 creates an entry in table 36 for the session of a frame received from a port directly connected to a computer 26, it creates a complimentary entry for the session in the opposite direction, if such an entry is required.

Alternatively or additionally, hardware unit 32 checks whether the packet was received from a port 30 connected directly to a computer 26, before it determines (72) the protocol to which the frame belongs, such that substantially all frames not received directly from a computer 26 are forwarded without consulting table 36. Further alternatively or additionally, entries in table 36 are created (88) only for sessions which include frames which are received from ports directly connected to end-stations 26.

In some embodiments of the invention, hardware unit 32 examines frames 40 according to known predetermined sizes of headers 44, 46 and/or 56 which are common to substantially all the frames transmitted through data networks. In an embodiment of the invention, frames which do not have the predetermined sizes, for example frames with IP options appended to IP header 46, are passed to processor 34 for policy enforcement. Alternatively or additionally, hardware unit 32 has a special unit for handling frames with non-standard header sizes or is capable of fast detection of values within frames of different sizes.

It is noted that the policy enforcement of the method of FIG. 5, does not require that switch 22 receive previous notice about forthcoming frames which require non-default policy behavior. The entries of table 36 may be created, in some embodiments, without receiving a control message so requesting.

Alternatively to transferring (76) to processor 34, only the frames containing the first packet of a TCP two-way session, the frames containing the first two packets (or first few packets) of a TCP two-way session are transferred to processor 34. Thus, in case the system manager configures rules in only one direction and/or the frames in opposite directions pass through different switches 22, switch 22 will still discard at least one of the first two packets of security violating two-way sessions. In an embodiment of the invention, hardware unit 32 identifies the first two packets of a two-way TCP session based on the SYN bit 62. That is, packets for which SYN bit 62 is set are transferred (76) to processor 34. In some embodiments of the invention, processor 34 applies different security rules to the first and second packets of a session and differentiates between them according to whether ACK bit 63 is set. The different rules may be due, for example, to the fact that the first packet is sent by an end-station initiating a session and the second packet is only a response to the other end-stations initiative.

In some embodiments of the invention, processor 34 may be programmed to create entries in table 36 for specific TCP sessions which are especially dangerous. These entries state that all TCP frames of these sessions should be discarded or should be transferred to processor 34 for special examination. For example, table 36 may have an entry which matches all frames headed to a specific computer, e.g., a computer which is especially vulnerable or carries especially sensitive information. The entry will direct all such frames to processor 34 for handling and, optionally, processor 34 will create in table 36 forwarding entries for frames of specific sessions. The entries of the special TCP sessions may be held permanently on table 36 (e.g., all sessions to a specific port), for example in embodiments with a table 36 which allows wildcards, or may be stored in the table responsive to receiving a first frame of the session.

Alternatively or additionally, hardware unit 32 may be programmed to handle certain TCP frames, e.g., frames received through specific ports, as non-TCP frames. In an exemplary embodiment, TCP frames received from a port leading to an external network are compared to the entries of table 36 and if no match is found they are transferred to processor 34.

In some embodiments of the invention, the policy enforcement method described in relation to FIG. 4 as applied to TCP frames is applied also to frames of other connection-based protocols (e.g., non IP protocols) in which, similarly to TCP, end-stations receiving packets of the protocol before a connection is formed will discard the received packets.

Alternatively to having processor 34 create (110) entries in table 36 for all non-TCP frames forwarded by the processor, in some embodiments of the invention entries are created only for sessions for which fast delivery of the frames of the session is important. For example, no damage is caused if frames directed to the well known UDP discard port are delayed slightly. Therefore, an entry in table 36 is not created for frames directed to the UDP discard port, and all such frames are transferred to processor 34 for determining whether they should be forwarded. In an exemplary embodiment of the invention, entries are created in table 36 only for TCP and UDP packets. All other packets, generally control packets which are usually only a small fraction of the packets passing through network 20, are substantially always passed to processor 34 for policy enforcement.

Alternatively or additionally, entries are created only for sessions which are expected to have at least a predetermined number of additional frames. Frames of sessions for which entries are not prepared will always be transferred to processor 34 for handling. For example, frames of the DNS protocol are usually stand alone frames for which no following messages are expected. Therefore, in some embodiments, no entries in table 36 are created for sessions directed to the well known port of the DNS protocol and/or to ports of similar protocols.

Using any of these alternatives reduces the number of entries in table 36 and hence the required size of table 36. As table 36 is implemented in hardware, the size of table 36 may strongly affect the price and operation speed of switch 22. In some embodiments of the invention, table 36 includes room for fewer than 1000 entries, optionally fewer than 500 entries. In an exemplary embodiment, table 36 comprises 128 entries for each 8 port group of the switch. In some embodiments of the invention, the number and nature of the alternative methods used to reduce the number of entries in table 36 is chosen based on the size of the table 36 used with switch 22. The decision is optionally made based on statistical measurements of the number of sessions of different types which a switch is expected to handle concurrently, such that the chances of switch 22 needing to create an entry when all the entries of table 36 are full is beneath a predetermined level.

Alternatively to forwarding all non-TCP packets based on either an entry in table 36 (102) or based on determination by processor 34 (109), hardware unit 32 forwards some UDP frames based on the ports to which they are directed and/or the port from which they are sent, as is now described.

It is noted that in order to establish a session with an ephemeral (i.e., not well known) UDP port of a destination computer, a preliminary session is generally held with a well known UDP or TCP port of the computer. In this preliminary session the source and destination computers agree between them on a ephemeral port to be used for the session. Therefore, if access control is implemented on all frames to (and/or from) well known ports, sessions with ephemeral ports which violate security rules cannot be held.

Figure 6:
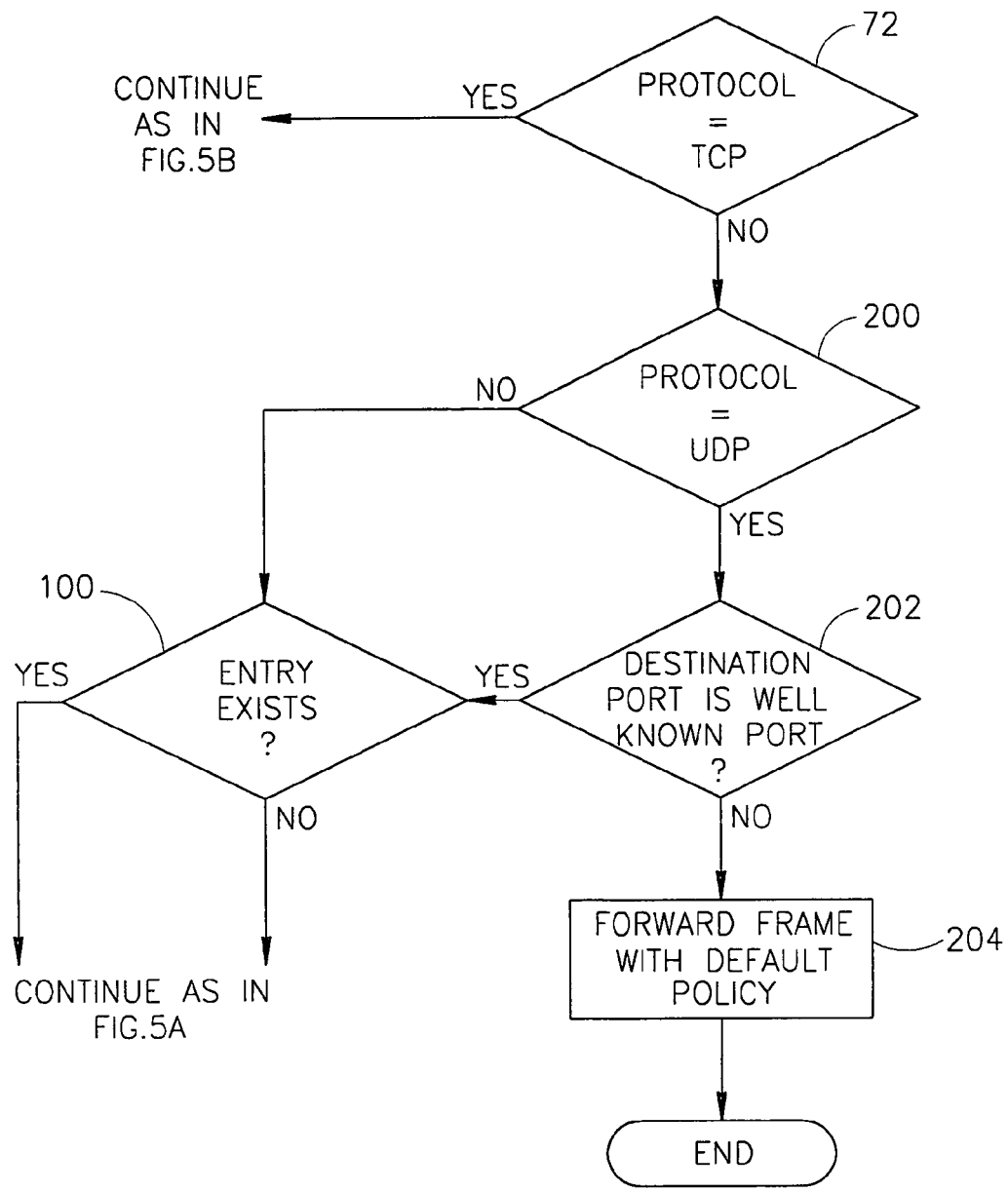
FIG. 6 is a flowchart of an optional extension of the method of FIGS. 5A and 5B for handling frames including UDP packets, in accordance with an embodiment of the present invention.

FIG. 6 is a flowchart of an optional extension of the method of FIGS. 5A and 5B for handling frames including UDP packets, in accordance with an embodiment of the present invention. When hardware unit 32 identifies (200) a frame 40 which contains a UDP packet it compares (202) the destination port and/or source port of the frame to a list of well known UDP ports for which computers 26 may have open ports. If frame 40 is directed to (or received from) a well known port the frame is compared (100) to the entries of table 36. If a matching entry is found, the frame is forwarded (or discarded) accordingly, as described in relation to FIGS. 5A and 5B. If no matching entry is found, the frame is transferred to processor 34. If, however, the frame is not directed to (or received from) a well known UDP port the packet is forwarded (204) without further examination.

Alternatively, all frames are first compared (100) to the entries of table 36. If a matching entry is found, the frame is forwarded (or discarded) accordingly. Otherwise, hardware unit 32 compares (202) the destination port and/or source port of the frame to the list of well known UDP ports. If the frame is directed to a well known port it is passed to processor 34, otherwise it is forwarded with default policy.

Alternatively or additionally to managing a list of well known ports, a complementary list of ephemeral ports is managed. Further alternatively or additionally, the list of ports for which access control is performed includes also one or more dangerous ephemeral ports and/or does not include well known ports which carry no danger (e.g., the discard port). In some embodiments of the invention, hardware unit 32 determines whether a port is a well known or ephemeral port using logical rules, e.g., determining whether the port number is within a predetermined range. In an exemplary embodiment, all the UDP ports up to about 1024 are handled as well known ports and the rest of the ports are handled as ephemeral ports, although this simplistic division is not always correct. The lists and/or ranges may be inserted by a manufacturer of switch 22 and/or by a system manager of network 20, together with the security rules or separately. In some embodiments of the invention, the list of well known ports may be updated when new well known ports are defined. In an embodiment of the invention, switch 22 periodically communicates with the end-stations to which it is connected in order to hold a complete list of the well known ports which they recognize. In some embodiments of the invention, different lists are held for different ports of the switch.

In some embodiments of the invention, the list of ports is held separately from table 36. Alternatively, the list is held within table 36 using wildcard values for the fields which do not relate to ports.

In some embodiments of the invention, a switch monitors only some of the well known ports, for example ports of protocols which are considered especially dangerous. For example, the list of well known ports which must be monitored may include the trivial file transfer protocol (TFTP) port which is dangerous as it may be used to transfer files. In another example, the discard port may be left out of the list as the frames directed to the discard port are anyhow discarded.

It is noted that keeping track of the well known ports may not be a complete security solution. Furthermore, an intruder may listen to a preliminary session and use the agreed ephemeral port to enter the destination computer in violation of the security rules. Therefore, the embodiment described in relation to FIG. 6, is optionally used only in cases in which other means are used to protect against intruders, e.g., a firewall on edge-router 27.

In some embodiments of the invention, all the entries of table 36 have the same key fields 122. Alternatively, in order to reduce the number of entries in table 36, at least some of the entries 120 in table 36 match frames of more than a single session. In an embodiment of the invention, for protocols for which the number (or percentage) of sessions for which entries are created in table 36 is expected to be relatively low (since entries are not created for most sessions), e.g., TCP and other connection based protocols, each entry defines a single session. Conversely, for protocols for which the number (or percentage) of sessions which need to be listed in table 36 is expected to be relatively high, at least some of the entries describe a family of sessions rather than a single session. For example, in one embodiment, TCP protocol entries 120A have a first group of key fields 122, UDP entries 120B have a second group of key fields 122 and other entries, e.g., ICMP entries 120C, have a third group of key fields 122. The different entries may be included in a single physical table with variable length entries or in a plurality of physically separate tables.

Figure 1:
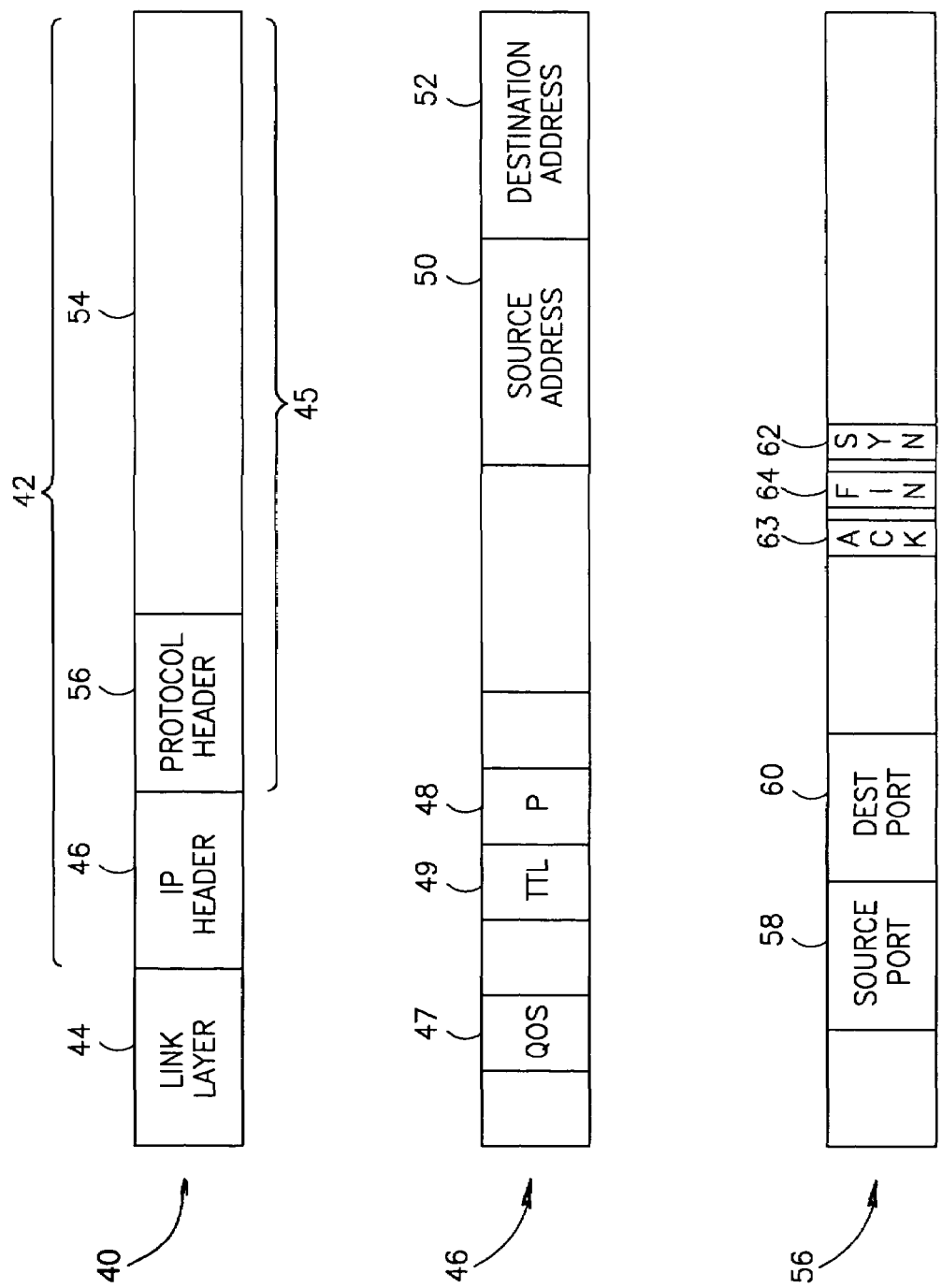
FIG. 1 is a schematic illustration of a data frame commonly transmitted through data networks.

In an exemplary embodiment of the present invention, the key fields 122 of TCP protocol entries 120A include the fields which define a session. These fields are compared to the respective fields 48, 50, 52, 58 and 60 in frame 40 (FIG. 1).

In an embodiment of the invention, the key fields 122 of UDP entries 120B include only protocol field 148, and source and destination IP address fields 150 and 152. It is noted that most sessions which have common values in fields 148, 150 and 152 have common desired values in result fields 124. For those sessions that have common values for fields 148, 150 and 152 but have different desired values in result fields 124, no entries are created in table 36 and all frames belonging to these sessions are passed to processor 34 for handling. Alternatively or additionally, some of key fields 122 may accept wildcard values which match all values (or groups of values) in frames 40. For example, sessions that have common values for fields 148, 150 and 152 are given a single entry 120 with wildcard values in fields 158 and 160.

In an embodiment of the invention, when processor 34 prepares an entry 120 based on a frame 40, it checks for each of the key fields 122 whether the value of that field as taken from the frame 40 may be replaced by a range of values or a wildcard without violating the security rules.

In some embodiments of the invention, some or all of the entries 120 in table 36 pertain to the two-way session described by key fields 122. Thus, there is no need to create two entries for each two-way session. Optionally, a field in table 36 indicates for each entry 120 whether the entry should be interpreted as pertaining to a two way session.

In an embodiment of the invention, when an entry should be created in table 36 but no room remains, an entry to be overwritten is chosen based on the time for which the entries were not used, e.g., the entry not used for the longest period is overwritten. Alternatively or additionally, the entry to be overwritten is chosen based on the time for which the entries are in table 36. Alternatively or additionally, the overwritten entry is chosen from those entries for which the chances of additional frames coming is relatively low. Further alternatively or additionally, the overwritten entry is chosen from those entries which in their absence the policy enforcement will be performed by processor 34, e.g., non-TCP entries. Further alternatively or additionally, the overwritten entry is chosen from those frames for which the delay caused due to transferring the frame to processor 34 is of low significance, for example frames which have relatively low QoS and/or frames directed to unimportant destination ports, e.g., the discard port. Further alternatively or additionally, the overwritten entry is chosen arbitrarily.

In some embodiments of the invention, entries in table 36 are discarded even when there remain unused entries in the table. In an embodiment of the invention, all entries are thrown out after a predetermined time from their creation. Alternatively, entries are thrown out if they are not used for a predetermined time. In some embodiments of the invention, switches 22 track TCP frames for which the FIN bit 64 (FIG. 1) is set and accordingly (optionally after a predetermined wait time) removes entries from table 36.

In some embodiments of the invention, processor 34 carries an entry cache in which entries which were removed from table 36 and/or which table 36 did not have room for them are stored. Processor 34 uses the cache entries to recreate the entries in table 36 when necessary and/or to perform fast policy enforcement on frames matching the entries in the cache.

Further alternatively or additionally, processor 34 searches for two or more entries which can be combined with minimal policy violation. For example, two entries which require sniffing and/or high QoS for frames of specific sessions transmitted to a single computer may be replaced by a single entry which performs sniffing and/or high QoS for all sessions to the single computer. When room in table 36 is available again the two entries may be separated again.

In an embodiment of the invention, the load on processor 34 is reduced by creating entries in table 36 for non-TCP sessions for which frames are to be discarded. For example, if over a predetermined number of frames belonging to specific sessions or category of sessions which should be discarded are received within a short period, processor 34 assumes that many more frames are on there way and creates an entry in table 36 instructing hardware unit 32 to discard these frames. In an exemplary embodiment of the invention, processor 34 creates entries in table 36 for TCP sessions which should be discarded with logging such that if additional packets belonging to the session are received although the first packet of the session was discarded, these packets are discarded and logged.

In some embodiments of the invention, table 36 may include in result fields 124, instructions to transfer matching frames to processor 34 for further analysis. In some embodiments of the invention, key fields 122 include destination and source address fields and optionally a protocol field. For each entry, security field 149 states whether matching frames should be discarded, forwarded without further analysis or leading frames should be transferred for further analysis to processor 34 while the rest of the frames should be forwarded without further analysis. Thus, the load on processor 34 is reduced, since not all leading frames are transferred to processor 34. In an embodiment of the invention, key fields 122 do not include a protocol field and result fields 124 include different security and/or other fields for various different protocols. In an exemplary embodiment, result fields include fields for UDP frames for TCP frames and for non-TCP non-UDP frames.

In some embodiments of the invention, backbone switch 24 has a structure similar to the structure of workgroup switches 22 and operates similarly. In an embodiment of the invention, however, backbone switch 24 does not differentiate between frames received through different ports in QoS policy enforcement. In some embodiments of the invention, backbone switch 24 performs QoS enforcement on all frames 40, as each frame has at least two hops to its destination. Alternatively, backbone switch 24 uses the QoS values tagged to the frames, as generally most frames received by backbone switch 24 already have authentic QoS values given by other switches of network 20. In one embodiment of this alternative, backbone switch 24 does not create entries in table 36 for TCP sessions, since, as described above, entries for TCP sessions are not created for security purposes. Alternatively or additionally, entries are created only for TCP sessions which require special policy handling other than access control and QoS, such as sniffing and/or counting.

In some embodiments of the invention, workgroup switches 22 and/or backbone switch 24 do not perform policy enforcement on frames which are known to have passed policy enforcement in another switch of network 20. In an embodiment of the invention, frames received from a port connected to a switch known to perform policy enforcement are forwarded without performing policy enforcement, using the QoS tagged to the frame. Alternatively or additionally, frames on which policy enforcement was performed are marked with a symbol which notifies other switches that policy enforcement was already performed on the frame. Switches receiving these frames may forward them without performing policy enforcement. In an exemplary embodiment of the invention, an additional header which includes policy-related information is added to all packets transmitted through network 20 or to packets on which policy enforcement was performed. In another exemplary embodiment of the invention, a reserved field within IP header 46 and/or data-link layer header 44 is used to identify frames which underwent policy enforcement. For example, one of the reserved bits in the type of service (TOS) field of IP header 46 may be used for signaling that a frame passed policy enforcement. Alternatively or additionally, frames which passed policy enforcement are given a normally unused value in one of the fields in use, such as the type field of link layer header 44 or the multicast bit in the source address field in link layer header 44.

In some embodiments of the invention, one or more of switches 22 and/or 24 verifies that frames received from end-stations, or otherwise entering network 20, do not include indications that signify in network 20 that the frame passed policy enforcement. Such frames should be discarded or the indication should be removed. Alternatively, policy enforcement is performed on such frames immediately when they enter network 20.

In some embodiments of the invention, some switches of a network perform policy enforcement only on some of the frames they forward. In an exemplary embodiment of the present invention, a switch performs policy enforcement on frames received from its ports which lead to end-stations but does not perform policy enforcement (or performs partial policy enforcement) to frames received from ports which lead to switches which perform policy enforcement.

Alternatively or additionally, some switches cooperate in performing policy enforcement on frames which must pass through a sequence of switches. In an exemplary embodiment of the invention, a first switch performs policy enforcement for frames which are forwarded to a second switch only on frames which contain TCP packets. The second switch performs policy enforcement for frames received from the first switch only on frames which contain non-TCP packets.

Further alternatively or additionally, the various policy enforcement tasks are divided between the switches of a network. Optionally, each switch in a network performs a sub-group of the policy tasks offered by the network, such that together each frame has a chance to pass policy enforcement of each task in at least one (optionally in only one) switch. In an exemplary embodiment, workgroup switches 22 perform access control and QoS determination, while backbone switch 24 performs sniffing and counting tasks. Thus, all four policy tasks are performed on frames which pass through backbone switch 24 and at least one workgroup switch 22.

In some embodiments of the invention, one or more of workgroup switches 22 and/or backbone switch 24 do not include a table 36 and frames which are not forwarded without relation to the session they belong to, e.g., frames which are not non-first frames of a TCP session, are always transferred to processor 34. Alternatively, the switch does not perform policy enforcement on non-TCP or on UDP frames, and a consumer takes this into account in purchasing and installing the switch.

In some embodiments of the invention, the exact behavior of a switch is chosen from the above described embodiments and combinations thereof based on the processing power of its processor, the size of its table and the expected load on the switch.

It is noted that the embodiments of the present invention may be implemented on substantially any router, layer-2 and/or layer-3 switch, of substantially any hardware structure and/or functionality including switches other than workgroup switches 22 and backbone switches 24. It is further noted that different switches within a single network may implement the same or different of the embodiments described herein or combinations of the described embodiments. Furthermore, the present invention may be implemented on imitation switches, such as described in U.S. patent application Ser. No. 09/132,030, filed Aug. 8, 1998, the disclosure of which is incorporated herein by reference.

It is further noted that although the present invention has been described in relation to the TCP/IP protocol suite, some embodiments of the invention may be implemented with relation to other packet based transmission protocols, such as, for example IPX, DECNET and the ISO protocols. Furthermore, although the above embodiments relate to the Ethernet link layer, the present invention may be used with substantially any layer-2 protocol including, but not limited to, Frame relay, point to point modem, token ring, FDDI, ISDN, ASDL and ATM.

It is noted that the methods described in the above application are not necessarily-performed in the order described hereinabove. Rather, many of the described steps may be performed in other orders and/or some of the steps may be performed concurrently.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of performing policy enforcement by a switch, comprising:
    receiving a plurality of frames;
    examining at least some of the received frames to determine whether they require non-default policy enforcement according to pre-programmed policy rules which pertain to at least one protocol; and forwarding, with default policy handling, at least some of the received frames which belong to the protocol to which the rules pertain, regardless of the policy enforcement they require.

2. A method according to claim 1, comprising applying non-default policy enforcement to the examined frames which so require.

3. A method according to claim 1, wherein examining at least some of the received frames to determine whether they require non-default policy enforcement comprises determining whether the at least some of the received frames adhere to user pre-programmed security rules.

4. A method according to claim 3, comprising discarding examined frames which do not adhere to the security rules.

5. A method according to claim 1, wherein examining at least some of the received frames to determine whether they require non-default policy enforcement comprises determining the required quality of service of the frames.

6. A method according to claim 1, wherein examining at least some of the received frames to determine whether they require non-default policy enforcement comprises determining whether the at least some of the received frames require sniffing or counting.

7. A method according to claim 1, wherein examining the at least some of the received frames comprises comparing values of one or more of the fields of the frames to respective fields in a list of policies of groups of frames.

8. A method according to claim 7, wherein forwarding at least some of the frames regardless of the policy enforcement they require comprises forwarding, with default policy handling, non-leading frames of sessions of a connection-based protocol for which no match was found in the comparing to the list.

9. A method according to claim 7, wherein examining at least some of the received frames comprises checking frames for which no match was found in the comparison to the list against the pre-programmed rules.

10. A method according to claim 1, wherein forwarding at least some of the frames regardless of the policy enforcement they require comprises forwarding, with default policy handling, substantially all non-leading frames of sessions of a connection-based protocol.

11. A method according to claim 10, wherein forwarding, with default policy handling, substantially all non-leading frames of sessions of a connection-based protocol comprises forwarding, with default policy handling, substantially all frames starting with the third frame of two-way sessions of a connection-based protocol.

12. A method according to claim 10, wherein forwarding all non-leading frames of sessions of a connection-based protocol comprises forwarding, with default policy handling, substantially all frames starting with the second frame of two-way sessions of a connection-based protocol.

13. A method according to claim 10, wherein the connection-based protocol comprises the TCP protocol.

14. A method according to claim 10, wherein examining at least some of the received frames comprises examining leading frames of sessions of connection based protocols.

15. A method according to claim 10, wherein examining at least some of the received frames comprises examining frames of connectionless protocols.

16. A method according to claim 1, wherein forwarding, with default policy handling, at least some of the frames comprises forwarding, with default policy handling, frames which include IP packets.

17. A method according to claim 1, wherein forwarding, with default policy handling, at least some of the received frames regardless of the policy enforcement they require comprises forwarding, with default policy handling, substantially all the frames received from one or more specific physical ports of the switch.

18. A method according to claim 17, wherein the one or more specific physical ports are connected to switches which perform policy enforcement.

19. A method according to claim 17, wherein the one or more specific physical ports are not connected directly to end-stations.

20. A method according to claim 1, wherein forwarding, with default policy handling, at least some of the received frames regardless of the policy enforcement they require comprises forwarding, with default policy handling, frames received with indications that the frames underwent policy enforcement.

21. A method according to claim 1, wherein forwarding, with default policy handling, at least some of the received frames regardless of the policy enforcement they require comprises forwarding the at least some of the received frames without determining the policy they require.

22. A method according to claim 1, wherein forwarding, with default policy handling, at least some of the received frames regardless of the policy enforcement they require comprises forwarding at least one frame with a policy different than required by the preprogrammed rules.

23. A method according to claim 1, wherein forwarding, with default policy handling, at least some of the received frames regardless of the policy enforcement they require comprises forwarding, with default policy handling, frames which require policy handling which differs from the default only in the required quality of service.

24. A method of performing policy enforcement by a switch, comprising:
  receiving a plurality of frames;
  comparing the values of one or more fields of at least some of the plurality of frames to entries of a list;
  determining whether to additionally analyze the frames for which no match was found in the comparison;
  additionally analyzing at least some of the frames for which no match was found in the comparison; and
  forwarding at least some of the frames for which no match was found in the comparison without performing additional analysis.

25. A method according to claim 24, wherein the list identifies frames which may be forwarded without violating security rules.

26. A method according to claim 24, wherein additionally analyzing at least some of the frames for which no match was found in the comparison comprises analyzing those frames belonging to connectionless protocols.

27. A method according to claim 24, wherein additionally analyzing at least some of the frames for which no match was found in the comparison comprises analyzing leading frames of sessions of connection based protocols.

28. A method according to claim 24, wherein the one or more fields comprise source and destination address fields.

29. A method according to claim 24, wherein at least some of the frames are not compared to the entries of the list.

30. A method according to claim 29, wherein leading frames of sessions of connection based protocols are not compared to the entries of the list.

31. A method according to claim 24, wherein forwarding without performing additional analysis comprises forwarding those frames which are non-leading frames of connection based protocol sessions.

32. A method according to claim 24, wherein determining whether to additionally analyze comprises determining based on at least one field not included in the comparison.

33. A method according to claim 24, wherein determining whether to additionally analyze comprises determining the protocol to which the frame belongs.

34. A method according to claim 24, wherein the additional analysis is performed by a separate unit than performs the comparison.

35. A method according to claim 34, wherein the comparison is performed by a hardware unit of the switch and the additional analysis is performed by a processor of the switch.

36. A method according to claim 35, wherein the entries of the list are stored in a storage area of the hardware unit.

37. A switch for forwarding frames, comprising:
at least one port which receives frames; and
a table which includes entries which list policies of groups of frames, and indicates for at least one of the entries different behavior for leading and non-leading frames of sessions matching the entry.

38. A switch according to claim 37, comprising a hardware unit which forwards the non-leading frames of sessions matching the at least one of the entries which indicate different behavior for leading and non-leading frames, without further analysis.

39. A switch according to claim 37, comprising a processor which analyzes the leading frames of sessions matching the at least one of the entries which indicate different behavior for leading and non-leading frames.

40. A switch according to claim 37, wherein each entry of the table matches frames of a plurality of sessions.

41. A method of performing policy enforcement by a switch comprising:
receiving a plurality of frames:
comparing at least some of the received frames to a list of groups of frames and respective policies; and
creating entries in the list for less than all of the compared frames for which no match was found in the comparison to the list;
wherein creating entries in the list for less than all of the compared frames comprises creating entries only for frames received through physical ports connected directly to end-stations.

42. A method of performing policy enforcement by a switch, comprising:
receiving a plurality of frames;
comparing at least some of the received frames to a list of groups of frames and respective policies; and
creating entries in the list for less than all of the compared frames for which no match was found in the comparison to the list:
wherein creating entries in the list for less than all of the compared frames comprises not creating entries for at least some of the frames which require a policy which differs from a default policy only in quality of service.

43. A method of performing policy enforcement by a switch, comprising:
receiving a plurality of frames;
comparing at least some of the received frames to a list of groups of frames and respective policies; and
creating entries in the list for less than all of the compared frames for which no match was found in the comparison to the list;
wherein creating entries in the list for less than all of the compared frames comprises not creating entries for at least some of the frames which require a policy which differs from a default policy only in tasks other than quality of service.

44. A method of forwarding a frame by a switch, comprising:
receiving a frame;
checking one or more layer-3 or above fields of the frame for adherence to security rules; and
performing layer-2 hardware switching of the frame, if the frame adheres to the security rules;
wherein performing layer-2 switching of the frame comprises forwarding without changing a destination MAC address of the frame.

45. A method according to claim 44, wherein checking the frame for adherence to security rules comprises checking by a hardware unit.

46. A method of forwarding a frame by a switch, comprising:
receiving a frame;
checking one or more layer-3 or above fields of the frame for adherence to security rules; and
performing layer-2 hardware switching of the frame, if the frame adheres to the security rules;
wherein performing layer-2 switching of the frame comprises forwarding without changing a source MAC address of the frame.

47. A method according to claim 46, wherein checking the frame for adherence to security rules comprises checking by a hardware unit.

48. A switch for forwarding frames, comprising:
at least one port which receives frames;
a security unit which checks the received frames for adherence to security rules; and
a forwarding unit which performs layer-2 switching of frames which adhere to the security rules;
wherein the security unit comprises a policy table which has a plurality of entries to which the received frames are compared and the switch has at least one group of eight ports and the policy table has room for up to 256 entries for each group of eight physical ports of the switch.

49. A switch according to claim 48, wherein the switch cannot perform layer-3 routing.

50. A switch according to claim 48, wherein the security unit comprises a hardware unit.

51. A switch for forwarding frames, comprising:
at least one port which receives frames;
a policy table which includes entries, addressed by at least two key fields, for sessions which should receive non-default policy behavior;
a policy unit which checks whether at least some of the received frames which do not have respective entries in the policy table require non-default policy behavior; and
a forwarding unit which performs layer-2 switching of the at least some of the received frames in accordance with the policy behavior determined by the policy unit.

52. A switch according to claim 51, wherein the policy unit also checks whether received frames which have respective entries in the policy table require non-default policy behavior.

53. A switch according to claim 52, wherein the policy unit comprises a hardware unit which checks received frames which have respective entries and a processor which checks received frames which do not have respective entries in the table.

54. A switch according to claim 52, wherein the entries of the table are addressed by at least the IP source and destination addresses of the received frames.

55. A switch according to claim 52, wherein the entries of the table each define a single session.

56. A method of updating a policy table of a switch, comprising:
  receiving a frame which is not directed to the switch;
  determining whether the received frame requires non-default policy enforcement;
  creating an entry in the policy table of the switch for the session to which the received frame belongs if the received frame requires non-default policy enforcement; and
  performing layer-2 switching of the received frame;
  wherein determining whether the received frame requires non-default policy enforcement comprises checking whether the frame requires sniffing.

57. A method of updating a policy table of a switch, comprising:
  receiving a frame which is not directed to the switch;
  creating an entry in the policy table of the switch, for the session to which the received frame belongs; and
  performing layer-2 switching of the received frame;
  wherein receiving the frame comprises receiving a frame which does not relate to the same session as addressed by any recently received control message.

* * * * *